United States Patent
Strebelle

(10) Patent No.: US 7,516,055 B2
(45) Date of Patent: Apr. 7, 2009

(54) MULTIPLE-POINT STATISTICS (MPS) SIMULATION WITH ENHANCED COMPUTATIONAL EFFICIENCY

(75) Inventor: Sebastien B. Strebelle, Palo Alto, CA (US)

(73) Assignee: Chevron U.S.A. Inc, San Ramon, CA (US)

( * ) Notice: Subject to any disclaimer, the term of this patent is extended or adjusted under 35 U.S.C. 154(b) by 275 days.

(21) Appl. No.: 10/923,336

(22) Filed: Aug. 20, 2004

(65) Prior Publication Data

US 2006/0041410 A1    Feb. 23, 2006

(51) Int. Cl.
    *G06G 7/48* (2006.01)
(52) U.S. Cl. .................................... 703/10
(58) Field of Classification Search .............. 703/10
    See application file for complete search history.

(56) References Cited

U.S. PATENT DOCUMENTS

| | | |
|---|---|---|
| 5,475,589 A | 12/1995 | Armitage |
| 5,838,634 A | 11/1998 | Jones et al. |
| 5,999,485 A | 12/1999 | Anstey et al. |
| 6,035,255 A | 3/2000 | Murphy et al. |
| 6,044,328 A | 3/2000 | Murphy et al. |
| 6,070,125 A | 5/2000 | Murphy et al. |
| 6,295,504 B1 | 9/2001 | Ye et al. |
| 6,438,493 B1 | 8/2002 | West et al. |
| 6,477,469 B2 | 11/2002 | Ye et al. |
| 6,480,790 B1 | 11/2002 | Calvert et al. |
| 6,560,540 B2 | 5/2003 | West et al. |
| 2002/0042677 A1 | 4/2002 | West et al. |
| 2002/0183932 A1 | 12/2002 | West et al. |
| 2004/0008891 A1 | 1/2004 | Wentland et al. |
| 2004/0068378 A1 | 4/2004 | Schuette |
| 2004/0210547 A1 | 10/2004 | Wentland et al. |

OTHER PUBLICATIONS

Jonathan Goodman et al.; "Multigrid Monte Carlo method. Conceptual foundations", 1989, Physical Review D, vol. 40, No. 6, pp. 2035-2071.*

Tolga Bozkaya et al.; "Distance-based indexing for high-dimensional metric spaces", 1997, Proceedings of the 1997 ACM SIGMOD international conference on Management of data, pp. 357-368.*

Craig C. Douglas; "Multigrid methods in science and engineering", 1996, IEEE Computational Science and Engineering, vol. 3, Issue 4, pp. 55-68.*

(Continued)

*Primary Examiner*—Paul L Rodriguez
*Assistant Examiner*—Russ Guill
(74) *Attorney, Agent, or Firm*—Richard J. Schulte; Torrey Pennebaker

(57) ABSTRACT

An enhanced multi-point statistical (MPS) simulation is disclosed. A multiple-grid simulation approach is used which has been modified from a conventional MPS approach to decrease the size of a data search template, saving a significant amount of memory and cpu-time during the simulation. Features used to decrease the size of the data search template include: (1) using intermediary sub-grids in the multiple-grid simulation approach, and (2) selecting a data template that is preferentially constituted by previously simulated nodes. The combination of these features allows saving a significant amount of memory and cpu-time over previous MPS algorithms, yet ensures that large-scale training structures are captured and exported to the simulation exercise.

16 Claims, 7 Drawing Sheets

OTHER PUBLICATIONS

Jeff Caers et al.; "Multiple-point geostatistics: a quantitative vehicle for integrating geologic analogs into multiple reservoir models", 2002, pp. 1-24.*

Anthony P. Roberts, "Statistical reconstruction of three-dimensional porous media from two-dimensional images", 1997, Physical Review E, vol. 56, No. 3, pp. 3203-3212.*

Hiroshi Okabe et al.; "Prediction of permeability for porous media reconstructed using multiple-point statistics", 2004, Physical Review E, vol. 70, 066135, pp. 066135-1-066135-10.*

C.L.Y. Yeong et al.; "Reconstucting random media. II. Three-dimensional media from two-dimensional cuts", 1998, Physical Review E, vol. 58, No. 1, pp. 224-233.*

S. Strebelle, "New multiple-point statistics simulation implementation to reduce memory and cpu-time demand", Sep. 7, 2003, Conference of the International Association for Mathematical Geology 2003, Portsmouth, UK, six unnumbered pages.*

Clayton V. Deutsch et al., Hierarchical Object-Based Stochastic Modeling of Fluvial Reservoirs, Modeling of Fluvial Reservoirs, 1996, pp. 857-880, vol. 28, No. 7, 1996 International Association for Mathematical Geology.

Jef Caers et al., Stochastic Integration of Seismic Data and Geologic Scenarios: A West Africa Submarine Channel Saga, The Leading Edge, Mar. 2003, Interpreter's Corner, Coordinated by Rebecca Buxton Latimer.

S.F. Carle, Use of a Transition Probability/Markov Approach to Improve Geostatistical Simulation of Facies Architecture, U.S. Department of Energy, Lawrence Livermore National Laboratory, Nov. 1, 2000, pp. 1-4, Preprint UCRL-JC-141551.

Sebastien Strebelle, Conditional Simulation of Complex Geological Structures Using Multiple-Point Statistics, Jan. 2002, pp. 1-21, vol. 34, No. 1, 2002 International Association for Mathematical Geology.

Jef Caers et al., Geostatistical Integration of Rock Physics, Seismic Amplitudes and Geological Models in North-Sea Turbidite Systems, SPE International, Society of Petroleum Engineers, 2001, Society of Petroleum Engineers, Inc., SPE 71321.

Sebastien B. Strebelle et al., Reservoir Modeling Using Multiple-Point Statistics, SPE International, Society of Petroleum Engineers, pp. 1-11, 2001, Society of Petroleum Engineers, Inc., SPE 71324.

Sebastien Strebelle et al., Modeling of a Deepwater Turbidite Reservoir Conditional to Seismic Data Using Multiple-Point Geostatistics, SPE International, Society of Petroleum Engineers, pp. 1-10, 2002, Society of Petroleum Engineers, Inc., SPE 77425.

C. Ravenne et al., Quantification of Facies Relationships Via Proportion Curves, Chapter 2, pp. 19-40, 2002 Kluwer Academic Publishers.

Thomas T. Tran, Improving Variogram Reproduction on Dense Simulation Grids, 1994 Multiple Grid, pp. 1161-1168.

A. G. Journel, Combining Knowledge From Diverse Sources: An Alternative to Traditional Data Independence Hypotheses, Mathematical Geology, Jul. 2002, pp. 573-596, vol. 34, No. 5, 2002 International Association for Mathematical Geology.

* cited by examiner

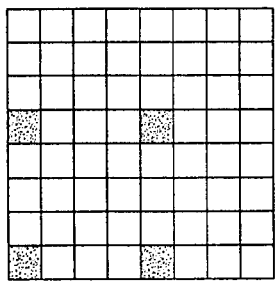

1st grid: 4 nodes
0 previously simulated node
4 nodes to be simulated

FIG. 2A
(Prior Art)

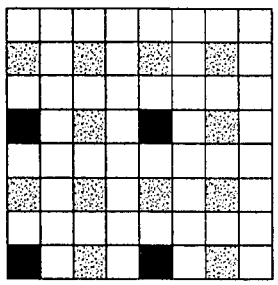

2nd grid: 16 nodes
4 previously simulated node
12 nodes to be simulated

FIG. 2B
(Prior Art)

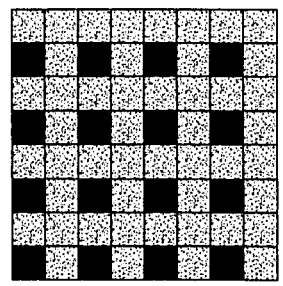

3rd grid: 64 nodes
16 previously simulated node
48 nodes to be simulated

FIG. 2C
(Prior Art)

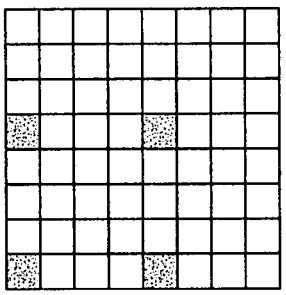

1st grid: 4 nodes
0 previously simulated node
4 nodes to be simulated

FIG. 3A

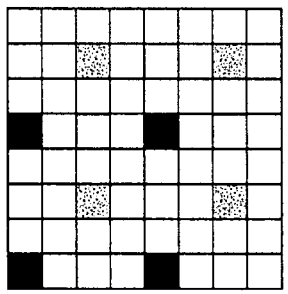

1st intermediary sub-grid within 2nd grid: 8 nodes
4 previously simulated nodes
4 nodes to be simulated

FIG. 3B

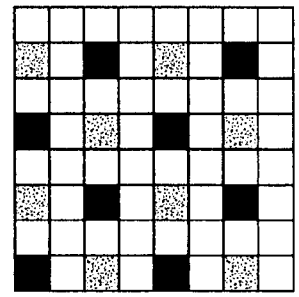

2nd intermediary sub-grid within 2nd grid: 16 nodes
8 previously simulated nodes
8 nodes to be simulated

FIG. 3C

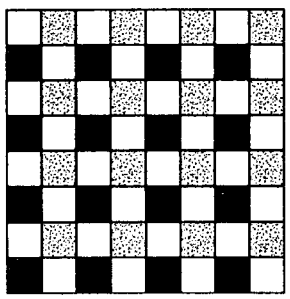

1st intermediary sub-grid within 3rd grid: 32 nodes
16 previously simulated nodes
16 nodes to be simulated

FIG. 3D

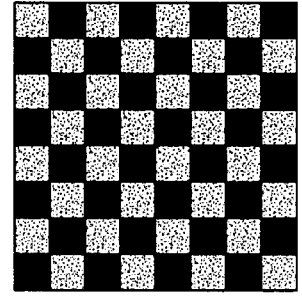

2nd intermediary sub-grid within 3rd grid: 64 nodes
32 previously simulated nodes
32 nodes to be simulated

FIG. 3E

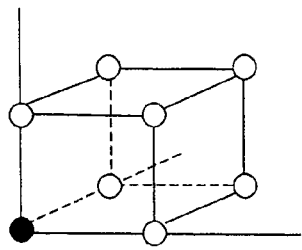
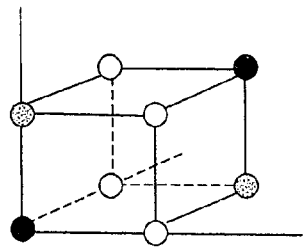
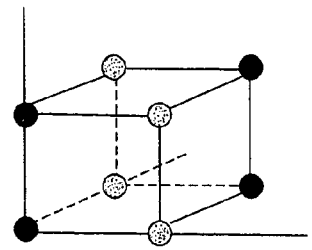

1st intermediary sub-grid:
2/8 nodes of the current grid
1/8 nodes have been previously simulated 2nd intermediary sub-grid:
4/8 nodes of the current grid
2/8 nodes have been previously simulated 3rd intermediary sub-grid:
8/8 nodes of the current grid
4/8 nodes have been previously simulated

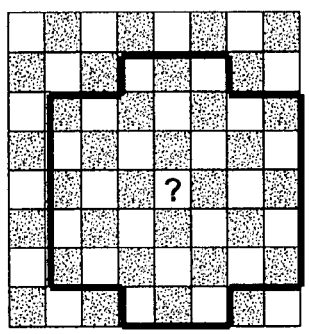
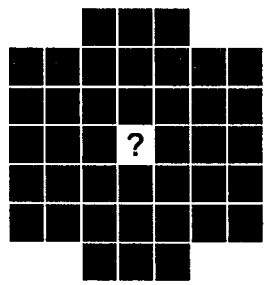
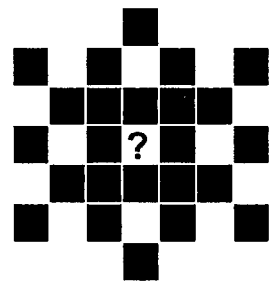

Data search window

Original data template:
40 data locations

New data template:
24 data locations

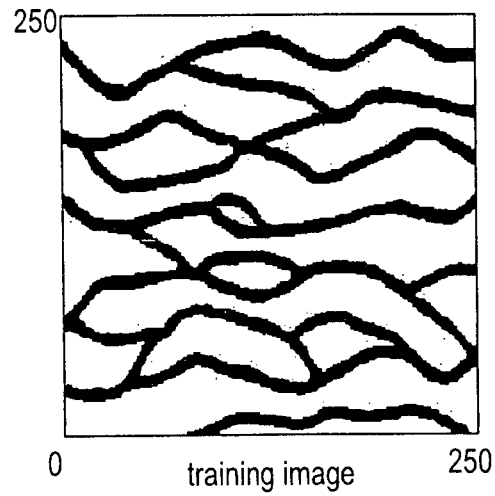
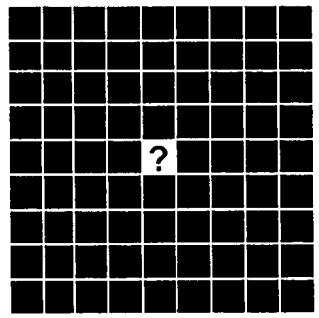
FIG. 6A — training image
FIG. 6B — 80-data template used for the original snesim
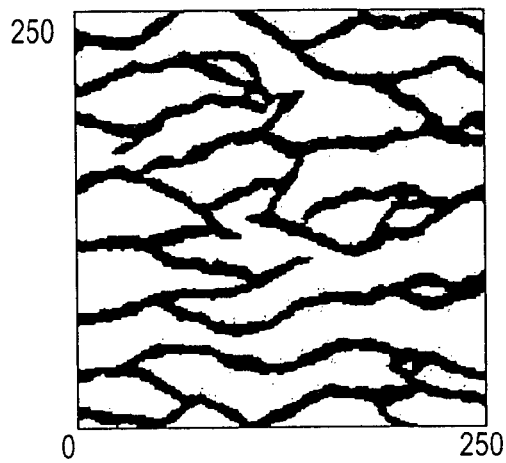
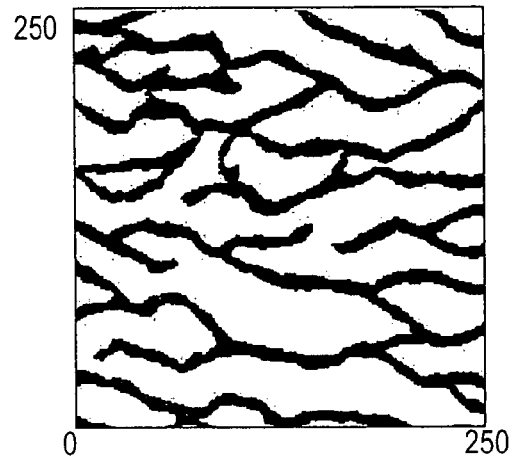
Simulated realization generated using the original multiple-grid simulation approach
Simulated realization generated using the new multiple-grid simulation approach
FIG. 6C
FIG. 6D

| Node | Conditioning data event $d_{n'}$ | $c_0(d_{n'})$: coordinates of central nodes u of corresponding $d_{n'}$-replicates | $c_1(d_{n'})$: coordinates of central nodes u of corresponding $d_{n'}$-replicates |
|---|---|---|---|
| <u>1</u> | no conditioning data | 14: (1,1) (2,1) (1,2) (2,2) (3,2) (4,2) (5,2) (1,3) (3,4) (4,4) (1,5) (2,5) (3,5) (4,5) | 11: (3,1) (4,1) (5,1) (2,3) (3,3) (4,3) (5,3) (1,4) (2,4) (5,4) (5,5) |
| <u>2</u> | $s_1 = 0$ | 5: (1,1) (2,1) (1,2) (3,4) (4,4) | 7: (3,1) (4,1) (5,1) (3,3) (4,3) (1,4) (2,4) |
| <u>3</u> | $s_1 = 1$ | 5: (2,2) (3,2) (4,2) (5,2) (1,3) | 3: (2,3) (5,3) (5,4) |
| <u>4</u> | $s_1 = 0; s_2 = 0$ | 3: (1,1) (1,2) (3,4) | 1: (2,4) |
| <u>5</u> | $s_1 = 0; s_2 = 1$ | 2: (2,1) (4,4) | 5: (3,1) (4,1) (3,3) (4,3) (1,4) |
| <u>6</u> | $s_1 = 1; s_2 = 0$ | 3: (2,3) (3,2) (4,2) | 0 |
| <u>7</u> | $s_1 = 1; s_2 = 1$ | 1: (1,3) | 1: (2,3) |
| <u>8</u> | $s_1 = 0; s_2 = 0; s_3 = 0$ | 1: (1,2) | 0 |
| <u>9</u> | $s_1 = 0; s_2 = 0; s_3 = 1$ | 1: (3,4) | 1: (2,4) |
| <u>10</u> | $s_1 = 0; s_2 = 1; s_3 = 0$ | 0 | 3: (3,3) (4,3) (1,4) |
| <u>11</u> | $s_1 = 0; s_2 = 1; s_3 = 1$ | 1: (4,4) | 0 |
| <u>12</u> | $s_1 = 1; s_2 = 0; s_3 = 0$ | 1: (2,2) | 0 |
| <u>13</u> | $s_1 = 1; s_2 = 0; s_3 = 1$ | 2: (3,2) (4,2) | 0 |
| <u>14</u> | $s_1 = 1; s_2 = 1; s_3 = 0$ | 1: (1,3) | 1: (2,3) |
| <u>15</u> | $s_1 = 0; s_2 = 0; s_3 = 1; s_4 = 1$ | 1: (3,4) | 1: (2,4) |
| <u>16</u> | $s_1 = 0; s_2 = 1; s_3 = 0; s_4 = 1$ | 0 | 2: (3,3) (4,3) |
| <u>17</u> | $s_1 = 0; s_2 = 1; s_3 = 1; s_4 = 0$ | 1: (4,4) | 0 |
| <u>18</u> | $s_1 = 1; s_2 = 0; s_3 = 0; s_4 = 0$ | 1: (2,2) | 0 |
| <u>19</u> | $s_1 = 1; s_2 = 0; s_3 = 1; s_4 = 0$ | 2: (3,2) (4,2) | 0 |
| <u>20</u> | $s_1 = 1; s_2 = 1; s_3 = 0; s_4 = 0$ | 0 | 1: (2,3) |

FIG. 8

MULTIPLE-POINT STATISTICS (MPS) SIMULATION WITH ENHANCED COMPUTATIONAL EFFICIENCY

CROSS-REFERENCE TO RELATED PATENT APPLICATIONS

This application hereby incorporates by reference simultaneously filed U.S. patent and patent application:
"Method for Creating Facies Probability Cubes Based Upon Geologic Interpretation," U.S. Pat. No. 7,079,953; and
"Method for Making a Reservoir Facies Model Utilizing a Training Image and a Geologically Interpreted Facies Probability Cube," U.S. patent application 2006-0041409.

BACKGROUND OF THE INVENTION

A traditional geostatistical workflow to model hydrocarbon reservoirs consists in modeling facies, then populating each facies with petrophysical properties, typically porosity and permeability, using variogram-based algorithms. Because the variogram is a only a two-point measure of spatial variability, variogram-based geostatistics do not allow modeling realistic curvilinear or other geometrically complex facies patterns, such as meandering sand channels, which are critical for connectivity and flow performance assessment.

A more recent modeling approach, referred to as multiple-point statistics simulation, or MPS simulation, has been proposed by Guardiano and Srivastava, *Multivariate Geostatistics: Beyond Bivariate Moments: Geostatistics-Troia*, in Soares, A., ed., Geostatistics-Troia: Kluwer, Dordrecht, V. 1, p. 133-144, (1993). MPS simulation is a reservoir facies modeling technique that uses conceptual geological models as 3D training images to generate geologically realistic reservoir models. The training images provide a conceptual description of the subsurface geological bodies, based on well log interpretation and general experience in reservoir architecture modeling. MPS simulations extract multiple-point patterns from the training image and anchor the patterns to the well data.

Numerous others publications have been published regarding MPS and its application. Caers, J. and Zhang, T., 2002, *Multiple-point Geostatistics: A Quantitative Vehicle for Integrating Geologic Analogs into Multiple Reservoir Models*, in Grammer, G. M et al., eds., Integration of Outcrop and Modern Analog Data in Reservoir Models: AAPG Memoir. Strebelle, S., 2000, *Sequential Simulation Drawing Structures from Training Images*: Doctoral Dissertation, Stanford University. Strebelle, S., 2002, *Conditional Simulation of Complex Geological Structures Using Multiple-Point Statistics*: Mathematical Geology, V. 34, No. 1. Strebelle, S., Payrazyan, K., and J. Caers, J., 2002, *Modeling of a Deepwater Turbidite Reservoir Conditional to Seismic Data Using Multiple-Point Geostatistics*, SPE 77425 presented at the 2002 SPE Annual Technical Conference and Exhibition, San Antonio, September 29-October 2. Strebelle, S. and Journel, A, 2001, *Reservoir Modeling Using Multiple-Point Statistics*: SPE 71324 presented at the 2001 SPE Annual Technical Conference and Exhibition, New Orleans, September 30-October 3.

SNESIM (Single Normal Equation Simulation) is an MPS simulation program which is particularly well known to those skilled in the art of facies and reservoir modeling. In particular, SNESIM simulation is described in detail in Strebelle, S., 2000, Sequential Simulation of Complex Geological Structures Using Multiple-Point Statistics, doctoral thesis, Stanford University and Strebelle, S., 2002, Conditional Simulation of Complex Geological Structures Using Multiple-Point Statistics: Mathematical Geology, V. 34, No. 1. Again, these publications are well-known to facies modelers who employ multiple point statistics in creating facies and reservoir models. These publications of Strebelle are hereby incorporated in their entirety by reference.

Experience has shown that the MPS simulation program SNESIM reproduces training patterns reasonably well. However, SNESIM is significantly more cpu-demanding than a comparable variogram-based simulation program SISIM, also developed at Stanford University. SNESIM requires a very large amount of memory to extract, then store patterns from 3D multimillion-nodes training cubes.

The MPS simulation program SNESIM described in the Strebelle dissertation (2000, pp.40-53) is based on the same sequential simulation paradigm as the traditional indicator variogram-based program SISIM. A condensation of this description SNESIM is contained in Appendix A of this specification. With SISIM the simulation grid nodes are visited one single time along a random path. SISIM is described in Deutsch, C. and Journel, A. (1998) *GSLIB: Geostatistical Software Library and User's Guide*, second edition, Oxford University Press, New York. Once simulated, a nodal value becomes a hard datum that will condition the simulation of the nodes visited later in the sequence. While in the variogram-based algorithm, kriging is performed at each unsampled node to estimate the local conditional distribution from which a simulated value is drawn, in MPS simulation that local conditional distribution is estimated by scanning a training image with a given data template of conditioning data (Guardiano and Srivastava, 1992).

The main contribution of the Strebelle dissertation (2000) was to decrease the cpu-time of Srivastava's original code by storing ahead of time all required conditional probability distribution functions (cpdf's) in a dynamic data structure called search tree. For convenience, Appendix B of this specification describes how the search tree of Strebelle (2000) is generated. More precisely, denote by W(u) the data search window centered at location u, and $\tau_n$ the data template constituted by the n vectors $\{h_\alpha, \alpha=1 \ldots n\}$ defining the n locations $u+h_\alpha$ of W(u). Prior to the simulation, the training image is scanned with a data template $\tau_n$, then the numbers of occurrences of all possible data events associated with data template $\tau_n$ are stored in the search tree. During the MPS simulation, the local cpdf's are retrieved directly from that search tree. Accordingly, the training image need not be scanned anew for each node simulation.

One major limitation of the search tree approach is that the data template $\tau_n$ cannot include too many grid nodes. There are two reasons for such limitation:

1. The amount of memory used to construct the search tree increases exponentially with the size of the data template: for an attribute taking K possible values, e.g. K facies values, the maximum number of possible data events associated with data template $\tau_n$ is $K^n$. Fortunately that maximum number is rarely reached.

2. The cpu-time needed to retrieve cpdf's from the search tree increases dramatically with a large data template $\tau_n$. At any unsampled node u, only n' ($\leq$n) data locations of data template $\tau_n$ are informed with conditioning data (original sample data or previously simulated nodes). Inference of the probability distribution conditional to the data event $d_{n'}$ constituted by those n' conditioning data requires calculating the number $c(d_{n'})$ of occurrences of $d_{n'}$ in the training image. This number is obtained by summing the numbers of occurrences of all data events $d_{n'}$ that are associated with data template $\tau_n$ and that include $d_n$:

$$c(d_n') = \sum_{\substack{d_n \text{ associated with } \tau_n \\ \text{such that } d_n' \subset d_n}} c(d_n)$$

The number $c(d_n)$ of occurrences of any such data event $d_n$ can be read directly from the search tree. The smaller the number n' of conditioning data, the greater the number of possible data events $d_n$ that include $d_{n'}$, the greater the cpu-time needed to retrieve all the related numbers $c(d_n)$ from the search tree. For an attribute taking K possible values, the number of possible data events $d_n$ that include $d_{n'}$ can be as large as $K^{n-n'}$.

The data template cannot include too many grid nodes for memory and cpu-time considerations. Yet, the data search window should be large enough to capture large-scale structures of the training image. One solution to alleviate this conflict is to use a multiple-grid approach, whereby a number G of nested and increasingly finer grids are simulated, see Tran, T., *Improving Variogram Reproduction on Dense Simulation Grids*, Computers and Geosciences, 20(7):1161-1168 (1994) and Strebelle dissertation (2000, p.46). The g-th ($1 \leq g \leq G$) grid is constituted by every $2^{g-1}$-th node of the final simulation grid. An example of multiple-grid simulation sequence applied to a 2D grid of size 8×8=64 nodes is shown in FIG. 2 with G=3 nested grids.

The data template is re-scaled proportionally to the spacing of the nodes within the grid to be simulated, which allows capturing large-scale training structures with large size templates at the coarse grid levels. The g-th grid is constituted by every $2^{nd}$ node of the next (g+1)-th grid. In 2D, the number of nodes within the (g+1)-th grid is then $2^2=4$ times the number of nodes within the previously simulated g-th grid. This means that, at the beginning of the simulation of the (g+1)-th grid, ¼ of the nodes within that grid are previously simulated (informed) nodes belonging to the g-th grid. Thus, in order to find at least, say, 20 data to condition the simulation of an unsampled (uninformed) node, a search data template $\tau_n$ constituted by n=4*20=80 nodal locations should be considered. (In 3D, the number of informed nodes in the (g+1)-th grid is $2^3=8$ times the number of uninformed nodes in the g-th grid, and a data template constituted by n=8*20=160 nodes would be needed.) For an attribute taking K=2 possible values, the maximum number of possible data events associated with such template $\tau_n$ is $K^n = 2^{80} = 1.3 \times 10^{24}$, and the maximum number of possible fully informed events that include a conditioning data event constituted by n'=20 data could be as large as $K^{n-n'} = 2^{60} = 1.2*10^{18}$. Fortunately, all these extremely large numbers are capped by the total number of nodes of the training image being scanned.

The present invention addresses previous shortcomings in the computational efficiency of the MPS methodology used in SNESIM.

SUMMARY OF THE INVENTION

Two solutions are proposed hereafter to decrease the size of the data search template: (1) use intermediary sub-grids in the multiple-grid simulation approach, and (2) select a data template that is preferentially constituted by previously simulated nodes. The combination of these two solutions allows saving a significant amount of memory and cpu-time, yet ensuring that large-scale training structures are captured and exported to the simulation exercise.

It is an object the present invention to use data templates of reduced size in multiple-point statistics simulations using search trees to enhance computational efficiency.

It is another object to use nested grids in an MPS simulation wherein the nested grids are generally equally composed of informed and uninformed nodes.

It is yet another object to use data templates which are primarily composed of the informed nodes and few uninformed nodes to reduce data template size and enhance computational efficiency.

BRIEF DESCRIPTION OF THE DRAWINGS

These and other objects, features and advantages of the present invention will become better understood with regard to the following description, pending claims and accompanying drawings where:

FIGS. 2A-C illustrate a prior art multiple-grid simulation sequence for a simulation grid of size 8×8=64 nodes using 3 nested increasingly finer grids with previously simulated nodes in black, nodes to be simulated within the current grid in gray, and nodes which are not be simulated in the step, in white;

FIGS. 3A-E depicts a multiple-grid simulation sequence, made in accordance with the present invention, for a simulation grid of size 8×8=64 nodes using intermediary sub-grids (previously simulated nodes are in black and nodes to be simulated within the current subgrid are in gray);

FIGS. 4A-C shows a multiple-grid simulation sequence in 3D using intermediary sub-grids (previously simulated nodes are in black and nodes to be simulated within the current sub-grid are in gray;)

FIGS. 5A-C illustrate 5A a second sub-grid associated with a fine 8×8 simulation grid (previously simulated nodes in gray, nodes to be simulated within the current sub-grid are in white), and a search window contoured in black; 5B) a prior art data template constituted by all grid nodes contained in the search window; and 5C) a new data template constituted by previously simulated nodes and the four closest unsimulated nodes to a grid for which an attribute is to be simulated;

FIGS. 6A-D show 6A) a training image; 6B) an 80-data template used for an original simulation; 6C) simulated realization generated using the original multiple-grid simulation approach; and 6D) simulated realization generated using the new multiple-grid simulation approach of the present invention;

FIG. 8 shows a table giving the coordinates of the central nodes u of all training replicates scanned to construct the search tree of FIG. 7C.

DETAILED DESCRIPTION OF THE INVENTION

Figure 1:
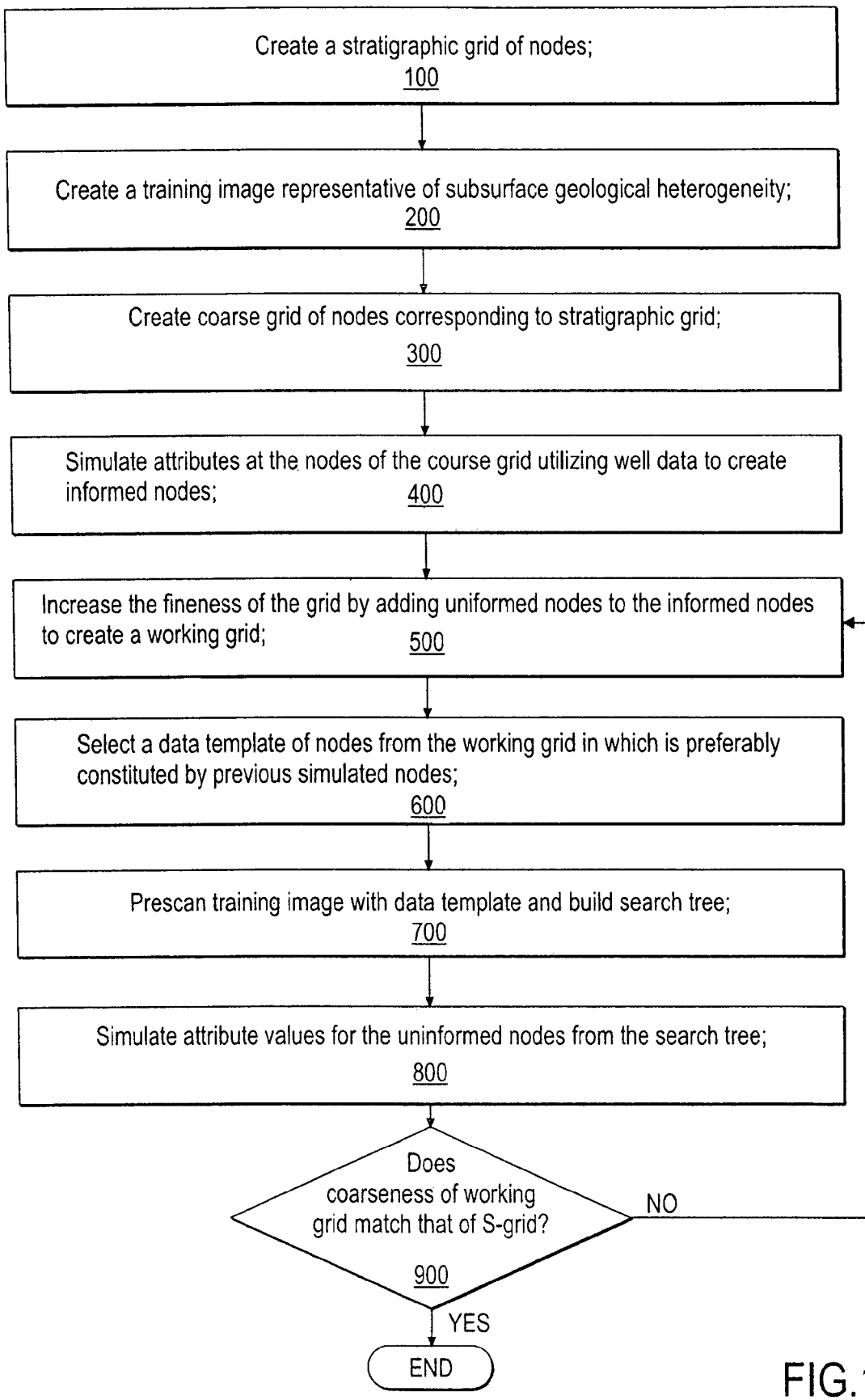
FIG. 1 is an overall flowchart of steps taken in a MPS simulation, made in accordance with the present invention, wherein data templates of reduced size are utilized to enhance the computational efficiency of the simulation.

FIG. 1 is a flowchart showing the steps taken in the present invention and which match those steps used in the conventional SNESIM algorithm. Appendix A is general theoretical explanation of how the SNESIM algorithm works and is a condensation of p. 40-53 of the Strebelle dissertation. The significant improvements, in the present invention, have been made in steps 500 and 600 as will be described in greater detail below. Comparisons and distinctions will be made between the conventional SNESIM algorithm and the enhanced MPS simulation of the present invention.

In the conventional SNESIM algorithm and the present invention, a stratigraphic grid of nodes is created in step 100 which is to be used to model a reservoir of interest. A training image is created in step 200 which reflects a modeler's conceptualization of the stratigraphic patterns and heterogeneities that may be present in the reservoir. In order to capture a broad overview of the reservoir and to limit the number of nodes in computations, an initial coarse grid of nodes is selected in step 300 which corresponds to the stratigraphic grid. Attributes, i.e. facies values, are then simulated in step 400 using well data and the training image. Preferably, these attributes are simulated using the MPS simulation steps to be described in greater detail below.

After determining these initial attributes at the coarse grid, the grid is refined in step 500 by adding additional nodes into the grid. This finer grid, or working grid, includes the nodes for which the attributes were previously simulated. These nodes are referred to as informed nodes as attributes have been assigned. The informed node may include known well data or else be simulated values. The additional nodes added to the working grid for which attributes are not yet known are called uninformed nodes. Step 500 is one of the steps in which an enhancement has been made in this invention to the basic SNESIM algorithm.

A data template of nodes is then selected from this refined working grid of nodes in step 600. This step has also been improved in the present invention over the conventional SNESIM implementation.

The training image is then scanned in step 700 using the data template of step 600 to create a search tree. The attributes of the uninformed nodes are then sequentially determined in step 800 from the search tree. Details on the creation of the search tree and how attributes for uninformed nodes may be determined can be found in Appendix B. Appendix B is from the Strebelle 2000 dissertation.

The working grid is then checked to see whether its fineness matches that of the stratigraphic grid. If yes, then all of the nodes have been assigned attributes. If not, then the fineness of the working grid is enhanced and attributes of additional uninformed nodes are determined by repeating steps 500 through 800 until the working grid matches the stratigraphic grid in number with all attributes, such as facies type, having been determined.

The conventional SNESIM MPS simulation suffers from being computationally intensive. Two solutions are proposed hereafter to decrease the size of the data search template: (1) use intermediary sub-grids in the multiple-grid simulation approach (step 500), and (2) select a data template that is preferentially constituted by previously simulated nodes (step 600). The combination of these two solutions allows saving a significant amount of memory and cpu-time, yet ensuring that large-scale training structures are captured and exported to the simulation exercise.

Simulation of Intermediary Sub-Grids

In order to reduce the size of the search data template, intermediary sub-grids within each grid is used in the original multiple-grid approach previously described, except for the very first (coarsest) grid. See FIGS. 3A-E. In a 2D, two sub-grids are considered. The first sub-grid associated with the (g+1)-th grid is constituted by the nodes of the previous g-th grid plus the nodes located at the center of the squares constituted by these nodes, as shown in FIG. 3 for the simulation of a grid of size 8*8=64 nodes. Half of the nodes in that first sub-grid are nodes previously simulated within the g-th grid. Thus, in order to find at least 20 conditioning data in the neighborhood of each unsampled node, the search template should contain 2*20=40 nodal locations. Note this compares to 80 required nodes when simulating the (g+1)-th grid directly as the conventional SNESIM algorithm. The second sub-grid is the (g+1)-th grid itself, its number of nodes is twice the number of nodes of the first sub-grid, see FIG. 3. Thus, again, half of the nodes of that sub-grid are previously simulated nodes, and a data search template with 40 nodal locations is large enough to find at least 20 conditioning data at each unsampled location.

In the present invention, it is desirable to have a relatively high informed node to total node ratio for the data template. Note that this ratio in FIG. 2A is 1/4. In FIG. 3 this ratio is higher, i.e. 1/2, which is higher than the 1/4 ratio found in conventional SNESIM. For a 3D grid, the ratio for conventional SNESIM is 1/8. IN the present invention, the ratio remains 1/2.

In the original SNESIM multiple-grid simulation approach, the original sample data, i.e., well data, are relocated to the closest nodes of the current simulation grid; they are reassigned to their original locations when the simulation of the grid is completed. In the new multiple-grid simulation approach of the present invention, the same data relocation process is applied to each sub-grid.

In 3D, the new multiple-grid approach proposed to reduce the size of the search template requires 3 sub-grids per nested grid in order that, as in 2D, the number of nodes within each sub-grid is twice that within the previous sub-grid, see FIGS. 4A-C.

Data Template Preferentially Constituted by Previously Simulated Node Locations

The size of the data template can be further reduced by retaining preferentially node locations that correspond to previously simulated nodes. Consider the simulation of a node of the second sub-grid associated with the fine 8*8 grid displayed in FIG. 5A. The data template corresponding to the search window shown in FIG. 5A would be constituted by 40 grid nodes if all grid nodes within that search window were retained, see FIG. 5B. Instead, it is proposed that the data template be constituted by:

the already simulated locations belonging to the previous sub-grid. There are 20 of them in the example of FIG. 5C; and a small number of node locations that do not belong to the previous sub-grid, but are close to the central location to be simulated, say the 4 closest nodes. At the beginning of the simulation of the current sub-grid, these locations are not informed unless they correspond to original sample data locations.

Note that the new proposed template, as displayed in FIG. 5C, still provides a well-balanced coverage of the space within the original search window limits.

For an attribute taking K=2 possible values, the number of possible data events associated with the 24-data template of FIG. 4C is: $2^{24}=1.7*10^7$, versus $2^{40}=1.1*10^{12}$ for the original 40-data template of FIG. 5B.

At each unsampled node, at least 20 conditioning data can be found. The maximum number of 24-data events that can include a specific conditioning 20-data event is:

$2^{24-20}=2^4=16$, to be compared with the maximum number of 40-data events that can include the same conditioning 20-data event: $2^{40-20}=2^{20}=10^6$.

Memory and CPU-Time Saving Tips

Using the proposed intermediary simulation sub-grids and a data search template preferentially constituted by previously simulated node locations allows decreasing the size of the data template, thus saving memory demand and cpu-time. It is, however, difficult to estimate precisely the amount of that saving, for the following reasons:

A new search tree must be constructed for each sub-grid. In 2D the number of search trees required by the new multiple-grid simulation approach is about twice the number of search trees required by the original approach, and about three times this number in 3D. However, the one-time cost of those additional search trees in terms of memory and cpu-time is expected to be minor compared to the saving expected from reducing the size of the data template. Recall that the cpu-time needed for a one-time construction of search trees is much smaller than the cpu-time needed to simulate multiple realizations of a 3D multimillion-nodes simulation grid.

In the previous analysis, orders of magnitude for the numbers of possible data events were provided. Because the training image displays repetitive patterns and has a limited size N (typically lesser than a few millions of nodes in 3D), the number of training data events associated with a data template $\tau_n$ is lesser than N, hence much lesser than the total number $K^n$ of possible data events associated with $\tau_n$. However, for an attribute taking K=2 possible values, using a template constituted by 24 nodal locations (instead of 80) does still lead to a significant decrease in memory demand, as illustrated by the case study presented hereafter.

The search tree actually consists of n levels. Let $\tau_{n'}=\{h_\alpha, \alpha=1 \ldots n'\}$ be the template constituted by the n' data locations of $\tau_n$ closest to its center. At level n' ($\leq n$) of the search tree are stored the numbers of training replicates of all possible data events $d_{n'}$ of size n' that are associated with the $\tau_{n'}$. If $n_{max}$ is the index of the furthest away conditioning datum found in the data search template centered at u, estimation of the probability conditional to the data event $d_{n'}$ requires only retrieving the numbers of occurrences of all possible data events $d_{nmax}$ that include $d_{n'}$. The number of such data events $d_{nmax}$ can be as large as $K^{nmax-n'}$, which may be much smaller than the number $K^{n-n'}$ of data events $d_n$ that include $d_{n'}$.

A pseudo-random path is used in the original SNESIM in order to simulate first the nodes informed with the largest number of conditioning data, see Strebelle (2000, p.47). However, except in presence of an extremely dense original sample data set, the number of conditioning data found for such best informed nodes remains close to ¼ of nodes contained in the data search window in 2D. The proposed new sub-grid approach would double that fraction.

Data Template Construction from a Search Ellipsoid

In the original SNESIM algorithm, the data template is provided by the user as formatted file where the relative coordinates of the template nodes are specified, see Geo-EAS format in the GSLIB software (Deutsch and Journel, 1998, p.21). An example of such file is provided in Strebelle thesis (2000, p.169). Using the new multiple-grid approach, one template per sub-grid would need to be provided by the user. In addition, it may be quite tedious for the user to find out then enter the template preferentially constituted by previously simulated node locations. For those two reasons, in the new SNESIM version as provided by the present invention, the template is preferably generated automatically using the following parameters provided by the user:

a data search ellipsoid defined by 3 radii and 3 angle parameters, as described in FIG. II.3 of the GSLIB user's guide: as radius, radius1, radius2, sang1, sang2, and sang3;

the number nclose of template locations corresponding to previously simulated nodes. The number of close nodes that have not been simulated yet is arbitrarily set to 4 in 2D as well as in 3D in the preferred embodiment of this invention.

Using these parameters, the data search template is constructed as follows:

Compute the distance of each grid node of the search ellipsoid to the ellipsoid center using the anisotropic distance measure associated with that search ellipsoid.

Rank the nodes in increasing distance order, and keep only those nodes that belong to the current simulation sub-grid.

Retain the nclose closest nodes that belong to the previous simulation sub-grid, i.e. the nclose closest previously simulated nodes, and the four closest nodes that have not been simulated yet. For the first (coarsest) simulation grid, since there are no previously simulated nodes, simply retain the nclose closest nodes of that grid.

Computation of the Number of Nested Grids in the Multiple-Grid Simulation Approach In the original SNESIM algorithm, the user must specify the number of nested grids to be used in the multiple-grid approach. In accordance with the present invention that number is computed, based on the data search ellipsoid and the template size provided by the user, using the following recursive subroutine:

Set the number nmult of nested grids to 1.

Using the anisotropic distance measure associated with the search ellipsoid, construct a data template $\tau_n=\{h_\alpha, \alpha=1 \ldots nclose\}$ such that, at any location u, the nclose locations $u+h_\alpha$ correspond to the nclose grid nodes closest to u.

If all the nclose locations $u+h_\alpha$ are within the search ellipsoid, increment nmult by 1, re-scale the template $\tau_n$ by multiplying all its vectors by 2, and check if all the locations of that re-scaled template are still located within the search ellipsoid. If they are, increment nmult again by 1, re-scale the data template . . . until at least one (re-scaled) template location is out of the search ellipsoid.

EXAMPLE

Application to the Simulation of a 2D Horizontal Section of a Fluvial Reservoir

In order to provide an estimate of the memory and cpu-time saved when decreasing the size of the data template, the performance of the modified SNESIM algorithm is compared with the original version on the simulation of a horizontal 2D section of a fluvial reservoir. The training image, displayed in FIG. 6A, depicts the geometry of the meandering sand channels expected to be present in the subsurface; the size of that training image is 250*250=62,500 pixels, and the channel proportion is 27.7%.

In the parameter file of the original SNESIM, the number nmult of nested increasingly finer grids to be used in the multiple-grid simulation approach was set to 6. The data template $\tau_n$ shown in FIG. 6B was used to construct the 6 search trees; that template consists of 80 grid nodes. The larger search tree obtained with that template was made of 2,800,000 nodes (Each search tree node correspond to one data event associated with a sub-template of $\tau_n$ and for which at least one occurrence can be found in the training image.)

One unconditional simulated realization generated by the original SNESIM is displayed in FIG. 6C. Using a 400 MHz Silicon Graphics Octane, the total time required by the simulation was 60.6 cpu seconds, of which constructing then deleting the 6 search trees took 28.8 seconds, and retrieving the local cpdf's from the search trees took 27.8 seconds.

For the modified SNESIM version made in accordance with the present invention, the number nclose of template data locations corresponding to previously simulated nodes was set to 20. An isotropic search ellipsoid was considered: radius=radius1=50, radius2=1, sang1=0, sang2=0, and sang3=0, the distance unit corresponding to the node spacing of the final simulation grid. Using those parameter values, the number of nested grids to be used in the new multiple-grid simulation approach was computed to be 6. FIG. 6D shows one unconditional simulated realization generated using the modified SNESIM version of the present invention. The reproduction of the training patterns is similar to the realization generated using the original SNESIM. One realization takes a total of 16.0 seconds, of which:

11.3 seconds to construct, then delete the 11 search trees. Recall that one search tree per sub-grid, i.e. 2 search trees per simulation grid except for the (first) coarsest grid, are constructed. Thus, although the modified SNESIM calls for more search trees, the cpu-time is divided by 2.5. In addition, the larger search tree utilizes only 100,000 nodes, versus 2,800,000 nodes for the original SNESIM.

3.6 seconds to retrieve all the required cpdf's from the search trees, which is eight times less than for the original SNESIM.

While in the foregoing specification this invention has been described in relation to certain preferred embodiments thereof, and many details have been set forth for purposes of illustration, it will be apparent to those skilled in the art that the invention is susceptible to alteration and that certain other details described herein can vary considerably without departing from the basic principles of the invention.

Appendix A

Multi-Point Statistics Simulation Using Search Trees—General Theory

Terminology

Consider an attribute S taking K possible states $\{s_k, k=1, \ldots, K\}$. S can be a categorical variable, or a continuous variable with its interval of variability discretized into K classes by (K−1) threshold values. The following terminology is used:

a data event $d_n$ of size n centered at a location u to be simulated is constituted by:
a data geometry defined by the n vectors $\{h_\alpha, \alpha=1, \ldots, n\}$
the n data values $\{s(u+h_\alpha)=\alpha=1, \ldots, n$
The central value of that data event is the unknown value to be evaluated, it is denoted as s(u).

a data template $\tau_n$ comprises only the previous data geometry. A subtemplate of $\tau_n$ is a template constituted by any subset n' of vectors of $\tau_n$ with $n' \leq n$.

The data event $d_n$ is said to be "associated" with the geometric template $\tau_n$. A cpdf (conditional probability distribution function) associated with $\tau_n$ is a probability distribution of the central value s(u) conditional to a specific data event $d_n$ associated with $\tau_n$.

Extended Normal Equations

Consider the attribute S taking K possible states $\{s_k, k=1, \ldots, K\}$. We wish to evaluate the local probability distribution of variable S(u) conditional to the nearest n hard data $S(u_\alpha)=s_{k_\alpha}, \alpha=1, \ldots, n$.

Denote by $A_0$ the binary (indicator) random variable associated to the occurrence of state $s_k$ at location u:

$$A_0 = \begin{cases} 1 & \text{if } S(u) = s_k \\ 0 & \text{if not} \end{cases}$$

Similarly, let D be the binary random variable associated to the occurrence of the data event $d_n$ constituted by the n conditioning data $S(u_\alpha)=s_{k_\alpha}, \alpha=1, \ldots, n$ considered jointly:

$$D = \begin{cases} 1 & \text{if } S(u_\alpha) = s_{k_\alpha}, \forall \alpha = 1, \ldots, n \\ 0 & \text{if not} \end{cases}$$

D can be decomposed into the product of the binary random variables associated to each conditioning datum:

$$D = \prod_{\alpha=1}^{n} A_\alpha, \text{ with } A_\alpha = \begin{cases} 1 & \text{if } S(u_\alpha) = s_{k_\alpha} \\ 0 & \text{if not} \end{cases}$$

The previous decomposition allows application of the (generalized) indicator kriging formalism, or extended normal equations.

$$Prob\{A_0 = 1 \mid D = 1\} + E\{A_0\} + \lambda[1 - E\{D\}] \quad (1)$$

$$Prob\{A_0 = 1 \mid D = 1\} = \frac{E\{A_0 D\}}{E\{D\}} = \frac{Prob\{A_0 = 1, D = 1\}}{Prob\{D = 1\}} \quad (2)$$

Thus the exact solution provided by indicator kriging identifies the definition of the conditional probability, as given by Bayes' relation.

Scanning the Training Image(S)

The exact solution (2) calls for (n+1)—point statistics much beyond the traditional two-point variogram or covariance model. There is usually no hope to infer such multiple-point statistics from actual (subsurface) data, hence the idea to borrow them by scanning one or more training images under a prior decision of stationarity (export license):

the denominator $Prob\{S(u_\alpha)=s_{k_\alpha}, \alpha=1, \ldots, n\}$ of expression (2) can be inferred by counting the number $c(d_n)$ of replicates of the conditioning data event $d_n=\{S(u_\alpha)=s_{k_\alpha}, \alpha=1, \ldots, n$ found in the training image(s). A replicate should have same geometric configuration and same data values.

the numerator $Prob\{S(u)=s_k \text{ and } S(u_\alpha)=s_{k_\alpha}, \alpha=1,\ldots,n\}$ is obtained by counting the number $c_k(d_n)$ of replicates, among the c previous ones, associated to a central value $S(u)$ equal to $s_k$.

The required conditional probability is then identified to the training proportion $c_k(d_n)/c(d_n)$:

$$p(u; s_k \mid (n)) = Prob\{S(u) = s_k \mid (n)\} = Prob\{A_0 = 1 \mid D = 1\} \quad (3)$$
$$\cong \frac{c_k d_n}{c(d_n)}$$

The SNESIM Algorithm

The snesim name chosen for the proposed simulation algorithm recalls that it involves only one single normal equation (sne), which leads to the very definition (2) of a conditional probability. SNESIM has been developed to simulate categorical attributes, e.g. geological facies, but could he extended to simulate continuous attributes such as a permeability field using a sequence of nested simulations:

first discretize the continuous attribute values into a finite number K of classes. In most reservoir applications, since flow simulation is controlled by the connectivity of extreme permeabilities associated with specific facies (e.g. sands and shales), there is no need for a fine discretization. Four classes of permeability values should be sufficient, for example, two extreme classes corresponding to the lowest and highest, deciles and two median classes, each with a marginal probability 40%.

simulate the resulting categorical variable using snesim, then within each category (class of values) simulate the original continuous variable using a traditional two-point algorithm such as the GSLIB sequential Gaussian simulation program sgsim (Deutsch and Journel, 1998, p.170).

The SNESIM algorithm is based on the sequential simulation paradigm whereby each simulated value becomes a hard datum value conditioning the simulation of nodal values visited later in the sequence (Goovaerts, 1997, p. 376). Guardiano and Srivastava (1993) proposed to scan the full training image anew at each unsampled node to infer the local conditional probability distribution of type (3). Such repetitive scanning can he very cpu-demanding, especially when considering a large training image or when generating a large number of realizations each with many nodes.

An alternative implementation would consist in tabulating ahead of time all required cpdf's (conditional probability distribution functions). However the large number of possible conditioning data events precludes any brute force tabulation, indeed:

a single template of n data variables, each taking K possible values or classes of values, generates K data events; e.g. K=10 classes and n=10 lead to $K^n=10^{10}$ possible conditioning data events!

in a sequential simulation mode, since the conditioning data include previously simulated nodes, and the grid nodes are visited along a random path, the geometry of the conditioning data event changes from one node to the other. Thus a very large number of data templates (geometric configurations) should be retained.

The algorithm implementation proposed in this thesis is much less cpu-demanding than Guardiano and Srivastava's implementation, without being too memory (RAM) demanding. This new implementation is based on the two following properties:

Property 1: Given a template $\tau_n$ of n data variables, the number of cpdf's associated to $\tau_n$ that can be actually inferred from the training image is related to the training image dimensions, hence is generally much smaller than the total number $K^n$ of cpdf's associated with $\tau_n$.

Consider a template $\tau_n$ of n data variables. A cpdf associated with $\tau_n$ can be inferred from the training image only if at least one occurrence of the corresponding conditioning data event can be found in the training image. Denote by $N_n$ the size of the eroded training image $\tau_n$ that could be scanned by $\tau_n$. Since only $N_n$ data events are scanned in $\tau_n$, the maximum number of cpdf's associated with $\tau_n$ that can be actually inferred from the training image is necessarily lesser than $N_n$, hence is usually a reasonable number in contrast to the huge number $K^n$ of all cpdf's associated with $\tau_n$.

Property 2: The probability distribution conditional to a data event $d_{n'}$ associated with a subtemplate $\tau_{n'}$ of $\tau_n$ (n'≦n) can be retrieved from the probability distributions conditional to the data events $d_n$ associated with $\tau_n$ and for which $d_{n'}$ is subset.

Let $d_{n'}$ be a data event associated with a subtemplate $\tau_{n'}$ of $\tau_n$ (n'≦n). In Appendix A, we show that the number $c(d_{n'})$ of replicates of $d_{n'}$ is equal to the sum of the replicates of all data events $d_n$ associated with $\tau_n$ and for which $d_{n'}$ is a subset:

$$c(d_{n'}) = \sum_{\substack{d_n \text{ ass. with } \tau_n \\ st. d'_n \subset d_n}} c(d_n)$$

Similarly for the number $c_k(d_{n'})$ of $d_{n'}$—replicates with a central value $S(u)$ equal to $s_k$:

$$c_k(d'_n) = \sum_{\substack{d_n \text{ ass. with } \tau_n \\ st. d'_n \subset d_n}} c_k(d_n)$$

Knowledge of $c_k(d_{n'})$ and $c(d_{n'})$ allows then estimating the probability distribution conditional to $d_{n'}$ using Relation (3.6).

Denote by $W(u)$ the data search neighborhood centered on location u. Consider the data template $\tau_n$ constituted by the n vectors $\{h_\alpha, \alpha=1,\ldots,n\}$ defined such that the n locations $u+h_\alpha, \alpha=1,\ldots,n$ correspond to all n grid nodes present within $W(u)$. The snesim algorithm proceeds in two steps:

1. First, store in a dynamic data structure (search tree) only those cpdf's associated with $\tau_n$ that can be actually inferred from the training image. More precisely, store in a search tree the numbers of occurrences of data events and central values ($c_k(d_n)$) actually found over the training image, and from which the training proportions (3.6) can be calculated. Section 1 of Appendix A provides a detailed description of that search tree. Because of Property 1, the amount of RAM required by the search tree is not too large if a data template $\tau_n$ with a reasonable number n of nodes, say, less than 100 nodes, is retained. The construction of that search tree requires scanning the training image one single time prior to the image simulation, hence it is very fast, see Section 2 of Appendix A.

2. Next, perform simulation by visiting each grid node one single time along a random path. At each node u to be simulated, the conditioning data are searched in W(u), hence the local conditioning data event is associated with a subtemplate of $\tau_n$. According to Property 2, the local cpdf can then be retrieved from the probability distributions conditional to the data events $d_n$ associated with $\tau_n$ and for which $d_{n'}$ is subset, these cpdf's are read directly from the search tree. That fast retrieval of any local cpdf is described in detail in Section 3 of Appendix A. The training image need not be scanned anew at each unsampled node, which renders the snesim algorithm much faster than Guardiano and Srivastava's implementation.

Figure 9:
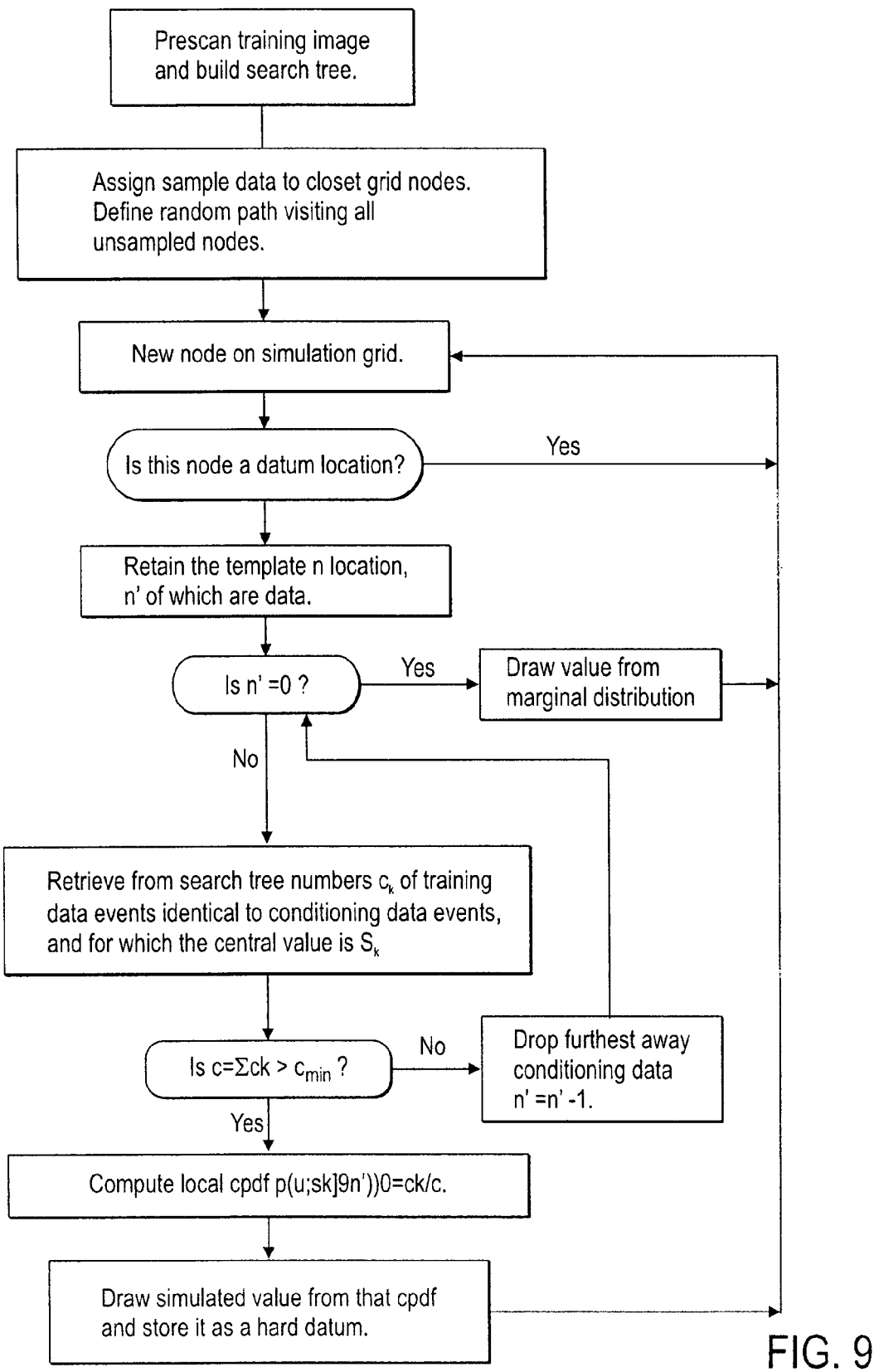
FIG. 9 is a flowchart of substeps of a simulation step 800 of FIG. 1 in which grid values are simulated from a search tree.

FIG. 9 is a flowchart showing the main steps of the SNE-SIM simulation algorithm.

1. Scan the training image(s) to construct the search tree for the data template $\tau_n = \{h_\alpha, \alpha=1, \ldots, n\}$ corresponding to the data search neighborhood retained. $\tau_n$ can be defined such that the n locations $u+h_\alpha, \alpha=1, \ldots, n$, correspond to n grid node locations closest to u, but not necessarily. The n vectors $h_\alpha$ are ordered per increasing modulus:

$$|h_1| \leq |h_2| \leq \ldots \leq |h_n|$$

Note that an anisotropic variogram distance could be used for that ordering.

2. Assign the original sample data to the closest grid nodes. Define a random path visiting once and only once all unsampled nodes.

3. At each unsampled location u, retain the conditioning data actually present within the search neighborhood defined by the template $\tau_n$ centered at u. Let n' be the number of those conditioning data (n'≤n), and $d_{n'}$ the corresponding conditioning data event. Retrieve from the search tree the numbers $c_k(d_{n'})$ of training $d_{n'}$-replicates for which the central value at u is equal to $s_k$, $k=1, \ldots, K$, as shown in Section 3 of Appendix A. Identify the local cpdf to the proportions of type (3.6) corresponding to the data event $d_{n'}$.

To ensure that these proportions are significant, hence avoid poor inference of the local cpdf, if the total number $$c(d'_n) = \sum_{k=1}^{K} c_k(d'_n)$$

of training $d_{n'}$-replicates is lesser than an input minimum value $c_{min}$, the furthest away conditioning datum is dropped reducing the number of conditioning data to (n'−1); the probability distribution conditional to this lesser data event $d_{n'-1}$ is retrieved again from the search tree, and so on ... If the number of data drops to n'=1, and c ($d_{n'}$) is still lower than $c_{min}$, the conditional probability $p(u; s_k|(n))$; is replaced by the marginal probability $p_k$.

4. Draw a simulated s-value for node u from the cpdf retrieved from the search tree. That simulated value is then added to the s-data to be used for conditioning the simulation at all subsequent nodes.

5. Move to next node along the random path and repeat steps 3 and 4.

6. Loop until all grid nodes are simulated. One stochastic image has been generated. Reiterate the entire process from step 2 with a different random path to generate another realization.

Conditioning to Hard Data

Two conditions must be met to ensure proper conditioning to hard data:

the hard data must be exactly reproduced at their locations.

as we come close to any hard datum location, the conditional variance should become smaller, shrinking to the nugget variance. More precisely, the variance of the L simulated values $\{s^{(l)}, l=1, \ldots, L\}$ at node u should decrease as that node gets closer to a hard datum location $u_\alpha$.

Relocating the sample data to the nearest simulation grid node and freezing their values ensures the first condition.

As the location u gets closer to the hard datum location $u_l$ the training probability distribution $\{p(u; s_k|(n)), k=1, \ldots, K\}$ gets closer to a single atom distribution at $S(u)=s_k$ if $S(u_l)=s_k$. Indeed, per spatial continuity of the training image the central value s(u) of any data template with $u_l$ close to u will be increasingly often in the same state as the conditioning datum value $s(u_l)$. The small scale spatial continuity of the training image is passed to the simulated realizations through the training proportions, hence as the node being simulated gets closer to a hard datum its conditional variance decreases as it does on the training image.

Multiple Grid Simulation Approach

The data search neighborhood defined by the data template $\tau_n$ should not be taken too small, otherwise large scale structures of the training image would not be reproduced. On the other hand, a large search template including too many grid nodes would lead to store a large number of cpdf's in the search tree, increasing cpu cost and memory demand.

One solution to capture large scale structures while considering a data template $\tau_n$ including a reasonably small number of grid nodes is the multiple grid approach (Gomez-Hernández, 1991; Tran, 1994). The multiple grid approach implemented in snesim consists of simulating a number G of nested and increasingly finer grids. The g-th (1<g<G) grid is constituted by each $2^{g-1}$-th node of the final simulation grid (g=1). The data template $\tau_n = \{h_\alpha, \alpha=1, \ldots, n\}$ is rescaled proportionally to the spacing of the nodes within the grid to be simulated. Let $\tau_n^g = \{h_\alpha^g, \alpha=1, \ldots, n\}$ be the resulting data template for the g-th grid: $h_\alpha^g = 2^{g-1} \cdot h_\alpha$, $\forall \alpha=1, \ldots, n$. The larger search neighborhoods (defined by $\tau_n^g$) of the coarser simulation grids allow capturing the large scale structures of the training image.

One search tree needs to be constructed per nested simulation grid, possibly using a different training image reflecting the heterogeneities specific to that scale. When the simulation of the g-th grid is completed, its simulated values are frozen as data values to be used for conditioning on the next finer simulation grid.

Note that the original sample data need not be located at nodes of the grid currently simulated. Proper conditioning requires assigning the original sample data to the closest nodes of the current simulation grid. When the simulation of the grid is completed, these sample data are reassigned to their original locations. The grid nodes from which the sample data are removed, are simulated later as nodes of the next finer grid.

Relocating the original sample data to the closest nodes of the current simulation grid may, however, affect the local accuracy of the simulated realizations. Hence only the finer grids should be simulated using search trees. For the coarser grids, the local cpdf at each unsampled node could be inferred using Guardiano and Srivastava's original implementation, i.e. by re-scanning the full training image at each node, in which case no data relocation is required. Because such re-scanning of the full training image is cpu-demanding, only the very coarse grids, say the grids constituted by each 8 (or more)-th node of the final simulation grid (which represents only 1.5% of the total number of grid nodes), should be simulated without using a search tree.

In the multiple-grid approach, a different training image can be used for each simulation grid. The training images can have a size (number of pixels) different from that of the initial simulation grid, but their resolutions (pixel size) must be the same. The construction of a search tree is very fast, but may be quite memory demanding when considering a very large training image or a template with a large number of nodes. Hence we allocate memory for any single search tree prior to the simulation of the corresponding simulation grid, then deallocate that memory once the simulation of the grid is completed.

Appendix B

Storing CPDF'S in a Search Tree

This section presents the dynamic data structure (search tree) under which conditional probability distributions inferred from the training image are stored then retrieved during the simulation performed with snesim.

B.1 Data Structure Used

Consider an attribute S taking K possible states $\{s_k, k=1, \ldots, K\}$. Denote by $W(u)$ the data search neighborhood centered on any unsampled location u, and consider the data template $\tau_n$ constituted by the n vectors $\{h_\alpha, \alpha=1, \ldots, n\}$ defined such that the n locations $u+\{h_\alpha, \alpha=1, \ldots, n\}$ correspond to all n grid nodes present within $W(u)$. The n vectors $h_\alpha$, are ordered per increasing modulus:

$$|h_1| \leq |h_2| \leq \ldots \leq |h_n|$$

An anisotropic variogram distance could have been used for that ordering.

The dynamic data structure presented hereafter allows retrieving all conditional probability distributions (cpdf's) existing in a training image, provided that the conditioning data configuration is included in $\tau_n$.

This dynamic data structure (search tree) consists of a linked set of nodes, where each node points towards up to K nodes of the next level. As an example, FIG. 7C shows the search tree obtained from the binary training image of size 5*5=25 pixels displayed in FIG. 7A using the data template $\tau_4$ of FIG. 7B state value 0 corresponds to white pixels, state value 1 to black pixels.

Each search tree node corresponds to one data event. Let $\tau_{n'}=\{h_\alpha, \alpha=1, \ldots, n'\}$ be the subtemplate constituted by the first n' vectors of $\tau_n$, the n' locations $u+\{h_\alpha, \alpha=1, \ldots, n'\}$ defining the subtemplate $\tau_{n'}$ correspond to the n' locations closest to u in the data search neighborhood $W(u)$. Nodes located at level n' ($\in[0,n]$) of the search tree correspond to data events associated with $\tau_{n'}$. In particular, the single node of level 0, from which the tree grows, is called 'the root', and corresponds to the data event $d_0$ no conditioning data present in the template.

Only nodes corresponding to data events for which at least one replicate is found in the training image are present in the search tree. Let consider the node associated to the data event $d_{n'}=\{s(u+h_\alpha)=s_{k_\alpha}, \alpha=1, \ldots, n'$
this node contains an array of K integers $\{c_k(d_{n'}), k=1, \ldots, K\}$, where $c_k(d_{n'})$ is the number of training replicates of $d_{n'}$ for which the central value $S(u)$ is equal to $s_k$. The total number of $d_{n'}$ is then:

$$c(d_n') = \sum_{k=1}^{K} c_k(d_n') \geq 1$$

a set of K pointers $\{P_k(d_{n'}), k=1, \ldots K\}$ is attached to the $d_{n'}$-node. $P_k(d_{n'})$ points towards the node of level n+1 corresponding to the data event $d_{n'}+1=\{d_{n'}, $ and $s(u+h_{n'}+1)=s_k\}$ provided that the $d_{n'}+1$-node is present in the search tree, i.e., provided that at least one $d_{n'}+1$-replicate is found in the training image. If this $d_{n'}+1$-node is missing, $P_k(d_{n'})$ is a 'null' pointer, which means that it does not point towards any further node.

Diagrammatically, at each node, the search tree splits into up to K branches.

In the binary search tree of FIG. 7C, the node associated to any data event $d_{n'}$ contain the numbers of training $d_{n'}$ for which the central node is a white pixel $(c_0(d_{n'}))$ or a black pixel $(c_1(d_{n'}))$. Two pointers are attached to $d_{n'}+1$-node: the left pointer $P_0(d_{n'})$ points towards the node of level n'+1 associated with the data event $\{d_{n'}, $ and $s(u_{n'}+1)=0\}$ (if this node is not missing) while the right pointer $P_1(d_{n'})$ points towards the node of level n'+1 associated with the data event $\{d_{n'}, $ and $s(u_{n'}+1)=1\}$ (if not missing).

For example, at the root (node 1 associated to the data event $d_0$ no conditioning data), $c_0(d_0)=14$ and $c_1(d_0)=11$, corresponding to the 14 white and 11 black pixels of the training image displayed in FIG. A.1a. $P_0(d_0)$ points towards the node of level 1 associated to the one-point data event $\{s(u+h_1)=0\}$ (node 2), while $P_1(d_0)$ points towards the node associated to $\{s(u+h_1)=1\}$ (node 3).

Figure 7A:
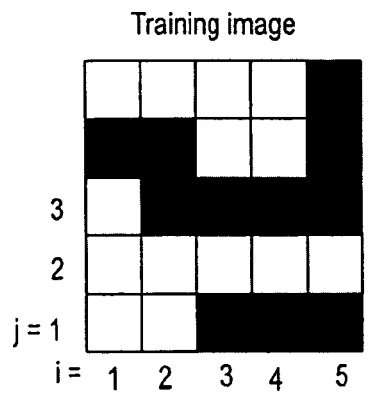
FIG. 7A-C illustrates a search tree example including 7A) a training image; 7B) a retained data template; and 7C) a search tree obtained from the training image using the search data template. The italic number below each node is the node reference number used in the table displayed in FIG. 8.

Denote by T the training image of FIG. 7A and by T the eroded training image scanned by the subtemplate $\tau_{n'}$, constituted by the first n' vectors of $\tau_n$: $T_{n'}=\{u \in T \text{st.} u+h_\alpha \in T, \forall \alpha=1, \ldots, n\}$. The eroded training image $T_1$ scanned by the subtemplate $\tau_1=\{h_1\}$ is constituted by the first four rows of T (j=1 ..., 4). 12 replicates of $d_1=\{s(u+h_1)=0\}$ can be found in $T_1$. The central value $s(u)$ is white for 5 of those $d_1$-replicates, black for the 7 other $d_1$-replicates, hence: $c_0(\{s(u+h_1)=0\})=5$ and $c_1(\{s(u+h_1)=0\})=7$ in node2. The coordinates of the central nodes u of all $d_1$-replicates are given in the table displayed in FIG. 8.

Similarly, 8 replicates of $\{s(u+h_1)=1\}$ can be found in the eroded training image $T_1$: 5 with a white central value, 3 with a black central value, hence in the corresponding search tree node 3: $c_0(\{s(u+h_1)=1\})=5$ and $c_1(\{s(u+h_1)=1\})=3$.

B.2 Prescanning to Construct the Search Tree

Constructing the search tree for the data template $\tau_n=\{h_{60}, \alpha=1, \ldots, n\}$ requires scanning the training image, denoted by T, one single time; it proceeds as follows:

1. Allocate memory for the root (data event $d_0$ corresponding to n'=0), and initialize the numbers $c_k(d_0)=0$ for $k=1, \ldots, K$.

2. At each grid node u of the (full) training image T, increment the number $c_k(d_0)$ corresponding to state $s_k$ observed at u.

Denote by $T_{n'}=\{u \in T \text{st.} u+h_\alpha \in T, \forall \alpha=1, \ldots, n'\}$ the eroded training image scanned by the subtemplate $\tau_{n'}$, constituted by the first n' vectors of $\tau_n$:

$$T_n \subset T_{n-1} \subset \ldots \subset T_1 \subset T_0 = T$$

Let $n_{max}$ be the index of that eroded training image such that:

$$u \in T_0, \ldots, T_{n_{max}}, u \notin T_{n_{max}+1}, \ldots, T_n$$

Retain the $n_{max}$ locations $u_\alpha$, of the subtemplate $\tau_{n_{max}}$: $u_\alpha = u + h_\alpha, \alpha=1$. Since the $n_{max}$ vectors $h_\alpha$ are ordered per increasing modulus, the $n_{max}$ locations $u_\alpha$, are ordered per increasing distance to u:

$$|u_1 - u| \leq |u_2 - u| \leq \ldots \leq |u_{n_{max}} - u|$$

Denote by $d_{n_{max}}=\{s(u+h_\alpha)=s_{k_\alpha}, \alpha=1,\ldots,n_{max}\}$ the $n_{max}$-data event centered on u.

3. Starting from the root, consider the node of level 1 corresponding to the data event $d_1=\{s(u+h_1)=s_{k_1}\}$ constituted by the first datum of $d_{n_{max}}$. If the $d_1$-node is missing, allocate memory in the search tree to create it. Move to that node and increment the number $c_k(d_1)$ if the central value at u is $s_k$. Then consider the node of level 2 corresponding to the data event $d_2=\{s(u+h_1)=s_{k_1}, s(u+h_2)=s_{k_2}\}$ constituted by the first two data of $d_{n_{max}}$ and so on ... Loop through the sequence of data $s(u_\alpha), \alpha=1,\ldots,n_{max}$, a=1, ..., until the node of level $n_{max}$ corresponding to $d_{n_{max}}$ is reached and the number $c_k(d_{n_{max}})$ is incremented.
4. Move to the next grid node u of the training image T and repeat steps 2 and 3.
5. Loop until all grid nodes u of the training image have been visited.

Consider any data event $d_{n'}$ associated with the subtemplate $\tau_{n'}$ constituted by the first n' vectors of $\tau_n$, n'∈[0,n]. Suppose that, after scanning the training image, the node corresponding to $d_{n'}$ is missing in the search tree. This means that no replicate of $d_{n'}$ could be found in the training image. In such case, $c_k(d_{n'})=0, \forall k=1\ldots,K$. For example, in the search tree of FIG. 7C, the node corresponding to the data event constituted by 4 white pixels ($d_4=\{s(u_\alpha)=0, \alpha=1,\ldots,4\}$) is missing since no replicate of that data event is found in the training image: $c_0(d_4)=c_1(d_4)=0$.

Figure 7B:
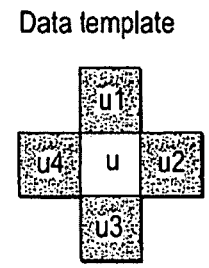
Figure 7C:
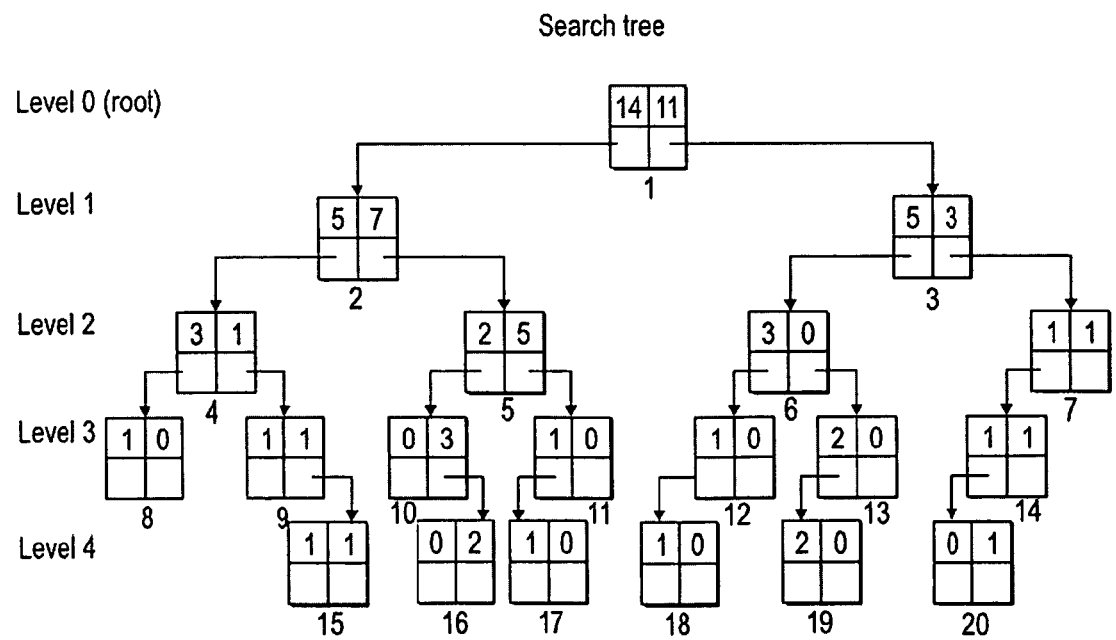

Not storing the null numbers $C_k(d_{n'})$ corresponding to missing nodes is critical to minimize memory demand. Indeed, denote by $N_{n'}$ the size (number of pixels) of the eroded training image $T_{n'}$. Since only $N_{n'}$ data events are scanned in $T_{n'}$, the number of nodes at level n' of the search tree is necessarily lesser than $N_{n'}$. For example, the eroded training image of $T_4$ scanned by the data template $\tau_4$ of FIG. 7B is constituted by the 9 central pixels of the original training image shown in FIG. 7B Thus the number of nodes at the last level of the resulting search tree was necessarily lesser than $N_4=9$, although, with a binary variable, a four-data template could generate a total $2^4=16$ possible data events. Indeed, only 6 nodes are present at level 4 of the search tree. In practice, the more structured the training image, the lesser the number of nodes in the search tree.

B.3 Retrieving CPDF'S from a Search Tree

Consider the inference of the probability distribution conditional to any n'-data event $d_{n'}$ associated with a subtemplate of $\tau_n$. The data event $d_{n'}$ can be associated with one of the subtemplates $\tau_{n'}$ defined by the first n' vectors of $\tau_n$: e.g., $d_1=\{s(u+h_1)=s_{k_1}\}$ associated with $\tau_1=\{h_1\}$, but this need not be so: e.g., $d_1=\{s(u+h_2)=s_{k_2}\}$ If $d_{n'}$ is associated with the particular subtemplate $\tau_{n'}$ defined by the first n' vectors of $\tau_n$ the corresponding $d_{n'}$-node can be searched in the search tree as follows:

Starting from the root (level 0) move to the node of level 1 corresponding to the data event $d_1=\{s(u+h_1)=s_{k_1}\}$ constituted by the first datum value of $d_{n'}$, provided that the $d_1$-node is present in the search tree. If the $d_1$-node is missing, then the $d_{n'}$-node is also missing, which means that there is no training replicate of $d_{n'}$, hence the probability distribution conditioned to $d_{n'}$ cannot be inferred from the training image. If the $d_1$-node is not missing, move to the node of level 2 corresponding to the data event $d_2=\{s(u+h_1)=s_{k_1}, s(u+h_2)=s_{k_2}\}$ constituted by the first 2 data values of $d_{n'}$, provided that the $d_2$-node exists, and so on ... until the $d_{n'}$-node is reached at level n' of the search tree. The probability distribution conditioned to $d_{n'}$ can be then estimated using the numbers $c_k(d_{n'})$:

$$p(u; s_k \mid (n')) = \tag{A.1}$$
$$\text{Prob}\{S(u) = s_k \mid S(u+h_\alpha) = s_{k_\alpha}, \alpha=1,\ldots,n'\} \cong \frac{c_k(d_{n'1})}{c(d_{n'})}$$

If the data event $d_{n'}$ is not associated with such a subtemplate $\tau_{n'}$, there is no corresponding $d_{n'}$-node in the search tree, whether $d_{n'}$-replicates are found in the training image or not. For example, the node associated to the data event $d_1=\{s(u_2)=0\}$ is not present in the search tree of FIG. 7C although $d_1$-replicates can be found in the training image of FIG. 7A. For such data events $d_{n'1}=\{s(u+h_{\alpha_1})=s_{k_1},\ldots,s(u+h_{\alpha_{n'1}})\}$, consider the smallest particular subtemplate $\tau_{n_{min}}$ (constituted by the first $n_{min}$ vectors of $\tau_n$) including $d_{n'}$:

$$\{h_{\alpha_1},\ldots,h_{\alpha_{n'1}}\} \subset \tau_{n_{min}} = \{h_\alpha, \alpha=1,\ldots,n_{min}\}$$

The general equality $\text{Prob}\{A\}=\Sigma_b \text{Prob}\{A \text{ and } B=b\}$ where the summation is carried over all states b possibly taken by the event B, can be applied to write the following relation:

$$\text{Prob}\{S(u)=s_k, S(u_{\alpha_1})=s_{k_{\alpha_1}},\ldots,S(u_{\alpha_{n'1}})=s_{k_{\alpha_{n'1}}}\} = \sum_{\substack{d_{n_{min}} \text{ ass. with } \tau_{n_{min}} \\ st. d_{n'1} \subset d_{n_{min}}}} \text{Prob}\{S(u)=s_k, d_{n_{min}}\}$$

where the summation is carried over all data events $d_{n_{min}}$ associated with the subtemplate $\tau_{n_{min}}$ and for which $d_{n'}$ is a subset. In terms of training data events:

$$c_k(\{s(u_{\alpha_1})=s_{k_{\alpha_1}},\ldots,s(u_{\alpha_{n'1}})=s_{k_{\alpha_{n'1}}}\}) = \sum_{\substack{d_{n_{min}} \text{ ass. with } \tau_{n_{min}} \\ st. d_{n'1} \subset d_{n_{min}}}} (d_{n_{min}})$$

Since the data events $d_{n_{min}}$ involved in the summation are associated to the particular subtemplate $\tau_{n_{min}}$, the numbers $c_k(d_{n_{min}})$ can be retrieved directly from the corresponding $d_{n_{min}}$-nodes at the level $n_{min}$ of the search tree.

Note that such calculation allows retrieving only those $d_{n'}$-replicates found in the eroded training image $\tau_{n_{min}}$ not in the eroded training image scanned by the $d_{n'}$-data configuration. This is however a minor limitation when considering large training images.

As an example, let estimate the probability distribution conditional to the data event $d_1=\{s(u_2)=0\}$ using the search tree of FIG. 7C $$c_k(d_2) = \sum_{\substack{d_2 \text{ ass. with } \tau_2 \\ st. d_1 \subset d_2}} (d_2) = c_k(\{s(u_1)=0, s(u_2)=0\}) + c_k(\{s(u_1)=1, s(u_2)=0\})$$

The numbers $c_k(d_2)$ can be retrieved directly from the search tree:

$$\begin{cases} c_0(\{s(u_1) = 0, s(u_2) = 0\}) = 3 \text{ and } c_1(\{s(u_1) = 0, s(u_2) = 0\}) = 1 \\ c_0(\{s(u_1) = 1, s(u_2) = 0\}) = 3 \text{ and } c_1(\{s(u_1) = 1, s(u_2) = 0\}) = 0 \end{cases}$$

Hence: $c_0(d_2)=6$ and $c_1(d_2)=1$, and the probability distribution conditional to $\{s(u_2)=0\}$ can be estimated by:

$$\begin{cases} p(u; 0 \mid s(u_2) = 0) \simeq 6/7 = 0.86 \\ p(u; 1 \mid s(u_2) = 0) \simeq 1/7 = 0.14 \end{cases}$$

What is claimed is:

1. A computer implemented method for simulating attributes in a stratigraphic grid for determining a subsurface reservoir model, wherein the computer implements the method comprising:
   (a) creating the stratigraphic grid of nodes of the subsurface reservoir model;
   (b) creating a training image representative of subsurface geological heterogeneity;
   (c) creating a coarse grid of nodes corresponding to nodes of the stratigraphic grid;
   (d) simulating attributes at the nodes of the coarse grid utilizing well data to get informed nodes;
   (e) refining the coarse grid of nodes by adding uninformed nodes to the informed nodes to create a working grid of nodes;
   (f) selecting a data template of nodes from the working grid and building a search tree using the data template and the training image;
   (g) simulating attributes for the uninformed nodes of the working grid using the search tree; and
   (h) repeating steps (e)-(g) until the attributes of the nodes in the stratigraphic grid of the subsurface reservoir model have been simulated; wherein in at least one of the refining steps (e), the ratio of informed nodes to the total number of nodes in the working grid is greater than 1/4 for a 2D grid and greater than 1/8 for a 3D grid.

2. The method of claim 1 wherein:
the ratio of informed nodes to the total number of nodes in the working grid is greater than 1/4 in all of the refining steps (e) for a 2D grid and greater than 1/8 for a 3D grid.

3. The method of claim 1 wherein:
in at least one of the refining steps (e), the ratio of informed nodes to the total number of nodes in the working grid is 1/2.

4. The method of claim 1 wherein:
the ratio of informed nodes to the total number of nodes in the working grid is 1/2 in a majority of the refining steps (e).

5. The method of claim 1 wherein:
the ratio of informed nodes to the total number of nodes in the working grid is 1/2 for each of the refining steps (e).

6. The method of claim 1 wherein:
the step of selecting the data template of nodes includes creating a search window and selecting informed nodes and only a portion of the uninformed nodes in the search window to create the data template of nodes in at least one of the steps (f).

7. The method of claim 6 wherein:
less than 1/2 of the uninformed nodes in the search window are selected to be part of the data template in at least one of the steps (f).

8. The method of claim 6 wherein:
the search window is an ellipsoid.

9. The method of claim 1 wherein:
the step of selecting the data template of nodes includes creating a search window and selecting informed nodes and uninformed nodes from within the search window with a majority of the selected nodes being informed nodes.

10. The method of claim 1 wherein:
the step of selecting the data template of nodes includes creating a search window and selecting all of the informed nodes and only a portion of the uninformed nodes from within the search window.

11. The method of claim 1 wherein:
the attributes are facies.

12. A computer implemented method for simulating attributes in a stratigraphic grid for determining a subsurface reservoir model, wherein the computer implements the method comprising:
   (a) creating the stratigraphic grid of nodes of the subsurface reservoir model;
   (b) creating a training image representative of subsurface geological heterogeneity;
   (c) creating a coarse grid of nodes corresponding to nodes of the stratigraphic grid;
   (d) simulating attributes at the nodes of the coarse grid utilizing well data to get informed nodes;
   (e) refining the coarse grid of nodes by adding uninformed nodes to the informed nodes to create a working grid of nodes;
   (f) selecting a data template of nodes from the working grid and building a search tree using the data template and the training image, the data template being selected by creating a search window and selecting informed nodes and uninformed nodes from within the search window with a majority of the selected nodes being informed nodes;
   (g) simulating attributes for the uninformed nodes of the working grid using the search tree; and
   (h) repeating steps (e)-(g) until the attributes of all nodes in the stratigraphic grid of the subsurface reservoir model have been simulated.

13. The method of claim 12 wherein:
in at least one of the refining steps (e), the ratio of informed nodes to the total number of nodes in the working grid is greater than 1/4 for a 2D grid and greater than 1/8 for a 3D grid.

14. The method of claim 12 wherein:
less than 1/2 of the uninformed nodes found within the search window are selected to be part of the data template.

15. The method of claim 12 wherein:
the step of selecting the data template of nodes comprises selection of all of the informed nodes and only a portion of the uninformed nodes from within the search window.

16. The method of claim 12 wherein:
the search window is an ellipsoid.

* * * * *